United States Patent
Rao D.S. et al.

(10) Patent No.: US 9,094,299 B1
(45) Date of Patent: Jul. 28, 2015

(54) AUTO-GENERATION OF PLATFORM-INDEPENDENT INTERFACE AND OPERATIONAL SCRIPTS FOR CONFIGURING NETWORK DEVICES

(71) Applicant: Juniper Networks, Inc., Sunnyvale, CA (US)

(72) Inventors: Satya Narsinga Rao D.S., Banglore (IN); Sri Ram Sankar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 415 days.

(21) Appl. No.: 13/736,866

(22) Filed: Jan. 8, 2013

(51) Int. Cl.
*G06F 15/177* (2006.01)
*H04L 12/24* (2006.01)

(52) U.S. Cl.
CPC .................................. *H04L 41/0803* (2013.01)

(58) Field of Classification Search
CPC .............. H04L 29/06; H04L 29/08072; H04L 29/08981; H04L 41/0806; H04L 41/12; H04L 41/0813; H04L 41/082; H04L 41/0886; H04L 41/00; H04L 41/22; H04L 43/00; H04L 41/20; H04L 41/14; H04L 41/145; G06F 8/65; G06F 3/04817; G06F 8/34
USPC ......................................... 709/220, 221, 223
See application file for complete search history.

(56) References Cited

U.S. PATENT DOCUMENTS

| | | | |
|---|---|---|---|
| 6,487,713 B1 * | 11/2002 | Cohen et al. .................... | 717/105 |
| 8,190,715 B1 * | 5/2012 | Narayanaswamy et al. .. | 709/220 |
| 2003/0005273 A1 * | 1/2003 | Perycz et al. ..................... | 713/1 |
| 2003/0191769 A1 * | 10/2003 | Crisan et al. .................... | 707/100 |
| 2004/0073899 A1 * | 4/2004 | Luk et al. ......................... | 717/158 |
| 2004/0138861 A1 * | 7/2004 | Onodera et al. ................... | 703/2 |
| 2007/0088630 A1 * | 4/2007 | MacLeod et al. ................ | 705/28 |
| 2007/0274230 A1 * | 11/2007 | Werber et al. .................. | 370/254 |

(Continued)

FOREIGN PATENT DOCUMENTS

| | | | |
|---|---|---|---|
| DE | 102008043095 A1 * | 4/2010 | |
| WO | WO 2004074952 A2 * | 9/2004 | |
| WO | WO 2007121218 A2 * | 10/2007 | |

OTHER PUBLICATIONS

"Extensible Markup Language (XML) 1.0 (Fifth Edition)", W3C Recommendation, Nov. 26, 2008, 63 pgs.
R. Enns et al., RFC 4741: "NETCONF Configuration Protocol," Network Working Group, the Internet Engineering Task Force draft, Dec. 2006, available at <http://tools.ietf.org/html/rfc4741>, 96 pgs.
"XML Schema Part 1: Structures Second Edition", W3C Recommendation, Oct. 28, 2004, 202 pgs.

(Continued)

*Primary Examiner* — Kostas Katsikis
(74) *Attorney, Agent, or Firm* — Shumaker & Sieffert, P.A.

(57) ABSTRACT

A network device is described that parses configuration data of the network device in accordance with a schema, for candidate configuration parameters. The device outputs a parameter identifier of each candidate configuration parameter, and in response, receives an indication of a selection of the candidate configuration parameters and corresponding labels. Both the selected parameters and the labels conform to a platform-independent interface for a remote procedure call for provisioning a service on any one of a plurality of different devices within a network. The device generates a device-specific configuration script for modifying the configuration data of the device in accordance with the schema of the device. The device-specific configuration script can receive, via the platform-independent interface for the remote procedure call, parameterized information associated with the selected parameters and update the configuration data based on the parameterized information.

20 Claims, 6 Drawing Sheets

(56) References Cited

U.S. PATENT DOCUMENTS

| | | | | |
|---|---|---|---|---|
| 2007/0274285 | A1* | 11/2007 | Werber et al. | 370/351 |
| 2009/0150524 | A1* | 6/2009 | Arai et al. | 709/220 |
| 2010/0077444 | A1* | 3/2010 | Forristal | 726/1 |
| 2010/0122198 | A1* | 5/2010 | Balla et al. | 715/771 |
| 2010/0293168 | A1* | 11/2010 | Gupta et al. | 707/748 |
| 2011/0208841 | A1* | 8/2011 | Robertson et al. | 709/220 |
| 2013/0054521 | A1* | 2/2013 | Cai et al. | 707/613 |
| 2013/0185715 | A1* | 7/2013 | Dunning et al. | 718/1 |
| 2013/0191755 | A1* | 7/2013 | Balog et al. | 715/735 |

OTHER PUBLICATIONS

Harrington et al., RFC 3411, "An Architecture for Describing Simple Network Management Protocol (SNMP) Management Frameworks," Network Working Group, the Internet Engineering Task Force draft, Dec. 2002, available at <http://tools.ietf.org/html/rfc3411>, 65 pgs.

* cited by examiner

AUTO-GENERATION OF PLATFORM-INDEPENDENT INTERFACE AND OPERATIONAL SCRIPTS FOR CONFIGURING NETWORK DEVICES

TECHNICAL FIELD

This disclosure relates to computer networks, and more particularly, to interfaces for interacting with devices within computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication. Large enterprises may operate computer networks that include hundreds or even thousands of geographically distributed network devices. These network devices typically include mechanisms, such as management interfaces, for locally or remotely configuring the devices. By interacting with the management interface, various clients, such as human administrators and automated scripts, can configure and provision a device for a particular service on the network.

In some cases a network device may provide multiple management interfaces of different types. For example, a network device may support a management interface that presents a command line interface by which a client can enter text-based commands to be applied by the network device. As another example, the network device may provide a management interface that by which the commands and configuration data may be specified in accordance with a data description language, such as the extensible markup language (XML). Examples of such interfaces include interfaces that support the Network Configuration (NETCONF) protocol, or a derivative thereof, such as the Juniper Device Management Interface, to perform the configuration. Such interfaces may be useful for computer-driven clients, such as automated scripts or network management systems. Further information on XML documents and the NETCONF protocol can be found in Extensible Markup Language (XML) 1.0 (Fifth Edition), W3C Recommendation 26 Nov. 2008, and R. Enns et al., RFC 4741: "NETCONF Configuration Protocol," Network Working Group, the Internet Engineering Task Force draft, December 2006, available at http://tools.ietf.org/html/rfc4741, respectively, the entire contents of both being incorporated herein by reference.

These mechanisms and management interfaces can be used to configure a device for a particular service. To configure a device for a particular service, the management interface may be used to read, write, and otherwise edit configuration data associated with a particular device. Configuration data of a device is typically specified in accordance with one or more manufacturer-supplied schemas (e.g., XML schemas typically in the form of XML Schema Definition (XSD) documents). Further information on XSD documents can be found in XML Schema Part 1: Structures Second Edition, W3C Recommendation 28 Oct. 2004, the entire contents is incorporated herein by reference. In general, schemas specify appropriate syntactical structure of configuration data specific to a particular device. For example, a schema may describe the elements and attributes of a valid configuration file for a given device in view of the specifications of the device, the functions provided by the device, the network requirements for configuration of the device (e.g., an Internet protocol (IP) address and hostname for the device), and mechanisms for interacting with the device. Using the management interface of a device, a client or network administrator can provide configuration data to the device, in the format specified by the schema, to correctly configure the device for a particular network service.

Without any standardization across industry, schemas may vary from one network device manufacturer to the next. Similarly, manufactures change schemas as new products and new product revisions are developed. Understanding the differences in schemas and managing and configuring devices in a large network that each use a different schema can be challenging for an administrator or client. Individually configuring and provisioning network devices to provide configuration data in a form and format that is specific to the type and version of the particular device can be time consuming, expensive, and undesirable.

SUMMARY

In general, this disclosure describes techniques for generating a device-specific script that runs on a network device to receive configuration commands per a common application programming interface (API) and configure the network device according to a particular schema of the device. The device-specific-script allows a user (e.g., a client, an administrator, etc.) to configure and provision a network device without understanding or having knowledge of the particular schema of the device. A script builder generates the device-specific script by parsing template configuration data of the device and prompting the user for information as to whether portions of the template configuration data should be parameterized. Once the device-specific script is enabled, the user can call the device-specific script via a command that satisfies the format of the common API. Data associated with the parameterized values is passed to the device-specific script during this command. The script configures the device according to the device-specific schema using the data associated with the parameterized values. In this manner, the user need not submit individualized configuration commands that satisfy the schema of a particular network device. The user can instead use a single common commands to configure an entire network of devices regardless of the schema used by each device.

In one example, a method comprises parsing, by a script builder module of a network device, configuration data of the network device in accordance with a schema of the network device for one or more candidate parameters for configuration. Each of the one or more candidate parameters may comprise a configurable attribute of the network device in the configuration data. The method may further include outputting, at an interface of the network device, a parameter identifier of each of the one or more candidate parameters. The method may further include receiving, at the interface of the network device, an indication of a selection of the one or more candidate parameters and a plurality of labels. Each label in the plurality of labels may correspond to a different one of the selected candidate parameters, and both the selected candidate parameters and the plurality of labels may conform to a platform-independent interface for a remote procedure call for provisioning a service on any one of a plurality of different devices within a network. The method may further include generating, by the script builder module of the network device, based at least in part on the selected candidate parameters and the schema, at least one configuration script for modifying the configuration data of the network device in accordance with the schema. Generating the at least one configuration script may comprise configuring the at least one configuration script to receive, via the platform-independent interface for the remote procedure call, parameterized information associated with at least one of the selected candidate parameters, and update, based on the parameterized information, the configurable attribute in the configuration data that corresponds to the at least one of the selected candidate parameters.

In another example, a device comprises a control unit configured to execute a script builder module. The script builder module may be configured to parse, configuration data of the device in accordance with a schema of the device for one or more candidate parameters for configuration. Each of the one or more candidate parameters may comprise a configurable attribute of the device in the configuration data. The script builder module may be further configured to generate, based at least in part on a selection of one or more of the candidate parameters and the schema, at least one configuration script for modifying the configuration data of the device in accordance with the schema. In generating the at least one configuration script the script builder may configure the at least one configuration script to receive, via a platform-independent interface for a remote procedure call for provisioning a service on any one of a plurality of different devices within a network, parameterized information associated with at least one of the selected candidate parameters, update, based on the parameterized information, the configurable attribute in the configuration data that corresponds to the at least one of the selected candidate parameters. The device may further include an interface configured to output an parameter identifier of each of the one or more candidate parameters and receive the indication of the selection of the one or more candidate parameters and a plurality of labels. Each label in the plurality of labels may correspond to a different one of the selected candidate parameters, and both the selected candidate parameters and the plurality of labels may conform to the platform-independent interface for the remote procedure call.

In another example, a computer-readable storage medium comprises instructions that, when executed, cause a processor to parse, by a script builder module executed by the processor, configuration data of a network device in accordance with a schema of the network device for one or more candidate parameters for configuration. Each of the one or more candidate parameters may comprise a configurable attribute of the network device in the configuration data. The instructions, when executed, may further cause the processor to output, at an interface executed by the processor, a parameter identifier of each of the one or more candidate parameters. The instructions, when executed, may further cause the processor to receive, at the interface executed by the processor, an indication of a selection of the one or more candidate parameters and a plurality of labels. Each label in the plurality of labels may correspond to a different one of the selected candidate parameters, and both the selected candidate parameters and the plurality of labels conform to a platform-independent interface for a remote procedure call for provisioning a service on any one of a plurality of different devices within a network. The instructions, when executed, may further cause the processor to generate, by the script builder module executed by the processor, based at least in part on the selected candidate parameters and the schema, at least one configuration script for modifying the configuration data of the network device in accordance with the schema. In generating the at least one configuration script the script builder module executed by the processor may configure the at least one configuration script to receive, via the platform-independent interface for the remote procedure call, parameterized information associated with at least one of the selected candidate parameters, and update, based on the parameterized information, the configurable attribute in the configuration data that corresponds to the at least one of the selected candidate parameters.

The details of one or more examples are set forth in the accompanying drawings and the description below. Other features, objects, and advantages will be apparent from the description and drawings, and from the claims.

DETAILED DESCRIPTION

Figure 1:
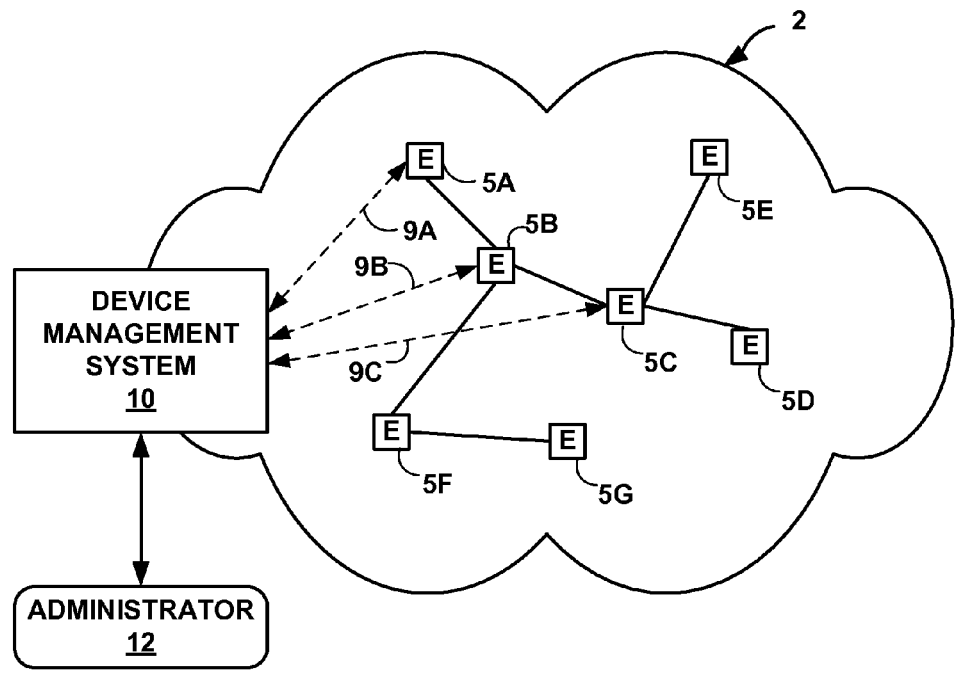
FIG. 1 is a block diagram illustrating a network of elements that are configurable with a device management system according to the techniques of this disclosure.

FIG. 1 is a block diagram illustrating a network 2 of elements 5A-5G that are configurable with a device management system 10 according to the techniques of this disclosure. Elements 5A-5G (collectively, "elements 5") of network 2 are network devices interconnected via communication links to form a communication topology in order to exchange resources and information. Elements 5 (also generally referred to as devices, network devices, or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 5 may be physical links (e.g., optical, copper, and the like) or wireless.

Device management system 10 is communicatively coupled to elements 5 via network 2 (e.g., enterprise network 2). Device management system 10 may be coupled either directly or indirectly to the various elements 5. Administrator 12 may use device management system 10 to manage and to configure elements 5 to specify certain operational characteristics that further the objectives of administrator 12. For example, administrator 12 may specify for an element 5 a particular operational policy regarding security, device accessibility, traffic engineering, quality of service (QoS), network address translation (NAT), packet filtering, packet forwarding, rate limiting, or other policies. Device management system 10 uses a network management protocol designed for management of configuration data within managed network elements 5, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. The Simple Network Management Protocol (SNMP) may allow device management system 10 to traverse and modify management information bases (MIBs) that store configuration data within each of elements 5. NETCONF is described in RFC 4741, as indicated above. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, device management system 10 and elements 5 are centrally maintained by an IT group of an enterprise and are collectively referred to as an element management system (EMS) or a network management system (NMS). Administrator 12 interacts with device management system 10 to remotely monitor and configure elements 5. For example, administrator 12 may view alerts received by device management system 10 regarding any of elements 5, view configuration data of elements 5, modify the configurations data of elements 5, add new elements 5 to network 2, remove existing elements 5 from network 2, or otherwise manipulate network 2 and elements 5 therein. Although described with respect to an enterprise network, the techniques of this invention are applicable to other network types, public and private, including local area networks (LANs), virtual LANs (VLANs), virtual private networks (VPNs), and the like.

In some examples, administrator 12 uses device management system 10 or a local workstation to interact directly with a management interface of each of elements 5 using a user interface. Example user interfaces supported by a management interface may include secure shell (SSH) interfaces, command line interfaces (CLI), web-based interfaces, graphical user interfaces (GUIs), and the like, by which administrator 12 can interact with elements 5 directly by issuing text-based and/or graphical based commands. In other examples, administrator 12 uses device management system 10 or a local workstation to indirectly interact with a management interface of each of elements 5. For instance, administrator 12 may write a script for configuring one of elements 5. Administrator 12 may invoke the script at device management system 10. The script may establish a network communication session between device management system 10 and the respective one of elements 5 according to a device management protocol. For instance, the script may establish NETCONF sessions between management device 10 and one or more of elements 5. The script may issue commands and transfer data according to the device management protocol to the respective one of elements 5 and in response, receive data from the respective one of elements 5.

In either case, whether communicating directly or indirectly with elements 5, administrator 12 configures elements 5 in accordance with a particular schema associated with each of elements 5 (e.g., an XML schemas in the form of an XSD document, as described above). Each particular schema specifies the proper syntax of communication for interacting with and configuring a respective one of elements 5. For example, the schema of element 5A describes the elements and attributes of a valid configuration file for element 5A in view of the specifications of element 5A, the functions that can be performed by element 5A, the network requirements for configuration of element 5A, and mechanisms and syntax of commands for interacting with element 5A. Schemas may vary across elements 5, such that a schema of one of elements 5 may differ from a schema of a different one of elements 5. Schemas may vary based on the capability and network services associated with each of elements 5. Schemas may also differ as a result of design choices made by a particular manufacturer or as a result of capability differences from one version of elements 5 to the next.

In the example of FIG. 1, management device 10 participates in NETCONF sessions 9A-9C with elements 5A-5C, respectively, to exchange commands, configuration data, operational data, and the like, between management device 10 and each of elements 5A-5C. NETCONF calls during NETCONF sessions are commonly used to remotely configure and provision network devices. Configuring a device for a particular service using NETCONF generally requires that the NETCONF session and parameterized data transmitted during the NETCONF session provide configuration data that conforms to a particular syntax and arrangement defined by the schema and the platform specifics of the respective device that is being configured. Since network devices and respective schemas for the configuration data can vary from one network device to the next, different sets of NETCONF calls and parameterized data may be required to configure different network devices for the same network service. The NETCONF calls, and the configuration data provided thereby, for configuring the different network devices for the same service can vary greatly from one network device to the next. As such, an administrator of an enterprise network may use extensive time and computing resources to manually write individualized sets of NETCONF calls to remotely configure the different network devices for the same network service. Adding a new device to the enterprise network may require a new and custom set of NETCONF calls to be generated for the new device.

In the example of FIG. 1, device management system 10 uses NETCONF as one example of a mechanism for remotely configuring and provisioning elements 5. That is, as described herein, rather than individually formatting each set of NETCONF calls to conform to the device-specific schemas of each of elements 5, device management system 10 uses the same set of NETCONF calls to configure each of elements 5 for a particular service. In other words, device management system 10 uses the same set of NETCONF calls for configuring each of elements 5, irrespective of the individual schemas of elements 5. Each of elements 5 executes a custom, device-specific configuration script that is invoked and receives parameter values according to a standard set of NETCONF calls, defined by a common API. The configuration scripts executing on each of elements 5 translate these parameter values into unique NETCONF configuration commands that meet the criteria of the schema of the underlying one of elements 5 where the configuration scripts are being executed. Moreover, the device-specific configuration scripts may be automatically generated for each of elements 5, thereby alleviating any burden on administrator 12 in creating such scripts.

In one example, device management system 10 may establish NETCONF sessions 9A-9C with element 5A-5C respectively. Each of elements 5A-5C may use a different respective schema and likewise, individually execute a device-specific configuration script that configures the one of elements 5A-5C in accordance with the respective schema of each of elements 5A-5C. Although the built-in logic of the configuration scripts may vary from one to the next, all the configuration scripts of network 2 present a same common API for receiving NETCONF calls from device management system 10. As such administrator 12 can configure elements 5A-5C using the same NETCONF calls to configure elements 5A-5C, irrespective of the schemas used by elements 5A-5C.

In one example described herein, administrator 12 may utilize a script builder configured to generate the device-specific configuration scripts that execute at each of elements 5A-5C. The script builder may reside and execute at device management system 10 or copies of the script builder may each reside and execute at each of elements 5A-5C. In either case, prior to configuring and provisioning elements 5A-5C of network 2, administrator 12 may use device management system 10 to invoke the script builder to generate one or more configuration scripts for each of elements 5A-5C.

By invoking the script builder for each of elements 5A-5C, the script builder may parse configuration data, which conforms to the schema(s) of the respective elements 5A-5C, for one or more candidate configuration parameters. For example, prior to invoking the script builder associated with element 5A, administrator 12 may use device management system 10 to generically configure element 5A for a particular service, thereby creating "template" configuration data. In other words, from device management system 10, administrator 12 may use device management system 10 to send commands (e.g., CLI, NETCONF, and the like) to configure one or more interfaces of element 5A for a target network service that administrator 12 wishes to deploy across multiple elements 5. These commands cause element 5A to generate template configuration data (e.g., one or more XML files) for the target network service that conforms to the schema(s) of element 5A.

After element 5A generates this template configuration data, administrator 12 may use device management system 10 to invoke the script builder associated with element 5A to generate a device-specific script for element 5A to present the common API to device management system 10. The script builder of element 5A may retrieve the template configuration data of element 5A and parse the template configuration data for fields, elements, attributes, leaf nodes, and other data that may represent configurable attributes (e.g., candidate configuration parameters) associated with element 5A.

The script builder may identify the configurable attributes as one or more candidate configuration parameters to be settable through the API to be presented by the device-specific script. For instance, the script builder may output a user interface from which administrator 12 may use device management system 10 to select which of the one or more candidate configuration parameters to include as configurable configuration parameters. By selecting one or more of the candidate configuration parameters, administrator 12 is in essence selecting which configuration parameters are to be included as configurable configuration parameters within the API and, therefore, modifiable by administrator 12 via NETCONF calls from device management system 10 to a configuration script executing on element 5A.

The script builder may receive a selection of the one or more candidate configuration parameters. For example, administrator 12 may use device management system 10 to select one or more of the candidate configuration parameters via the user interface. The script builder may receive an indication of the selection and based on the indication, determine which of the one or more candidate configuration parameters to include as configurable configuration parameters in the logic of the configuration script.

The script builder may generate, based on the selection and the schema, at least one configuration script. For example, the script builder may determine a set of NETCONF calls, formatted according to the schema of element 5A, for modifying each of the selected configuration parameters. In other words, for each of the selected configuration parameters, the script builder may generate scripting language that can be invoked at element 5A. A call to this scripting language will perform the set of NETCONF calls, formatted according to the schema of element 5A, for modifying each of the selected configuration parameters.

For each selected configuration parameter, the script builder may add a wrapper around the associated scripting language that conforms to the common API for configuring each of elements 5 of network 2. In other words, the script builder may generate scripting language that can be invoked at element 5A using the syntax of the common API to perform the set of NETCONF calls, formatted according to the schema of element 5A, for modifying each of the selected configuration parameters.

The script builder may assemble the scripting language associated with each of the selected configuration parameters into a single configuration script, having an interface formatted according to the common API, that can be invoked, e.g., via NETCONF or CLI, to configure the selected configuration parameters of element 5A. A call to this script will configure element 5A by modifying data associated with each of the selected configuration parameters, according to the schema of element 5A, for modifying each of the selected configuration parameters.

In this way, administrator 12 may use device management system 10 to invoke the script builder associated with each of elements 5A-5C to generate a configuration script for each one of elements 5A-5C. After each of elements 5A-5C has been updated to include a device-specific configuration script, administrator 12 can configure one or all of elements 5A-5C by invoking the configuration script, e.g., using CLI, NETCONF calls, in a format according to the common API, without considering or understanding the underlying schemas for the configuration data of each element.

Figure 2:
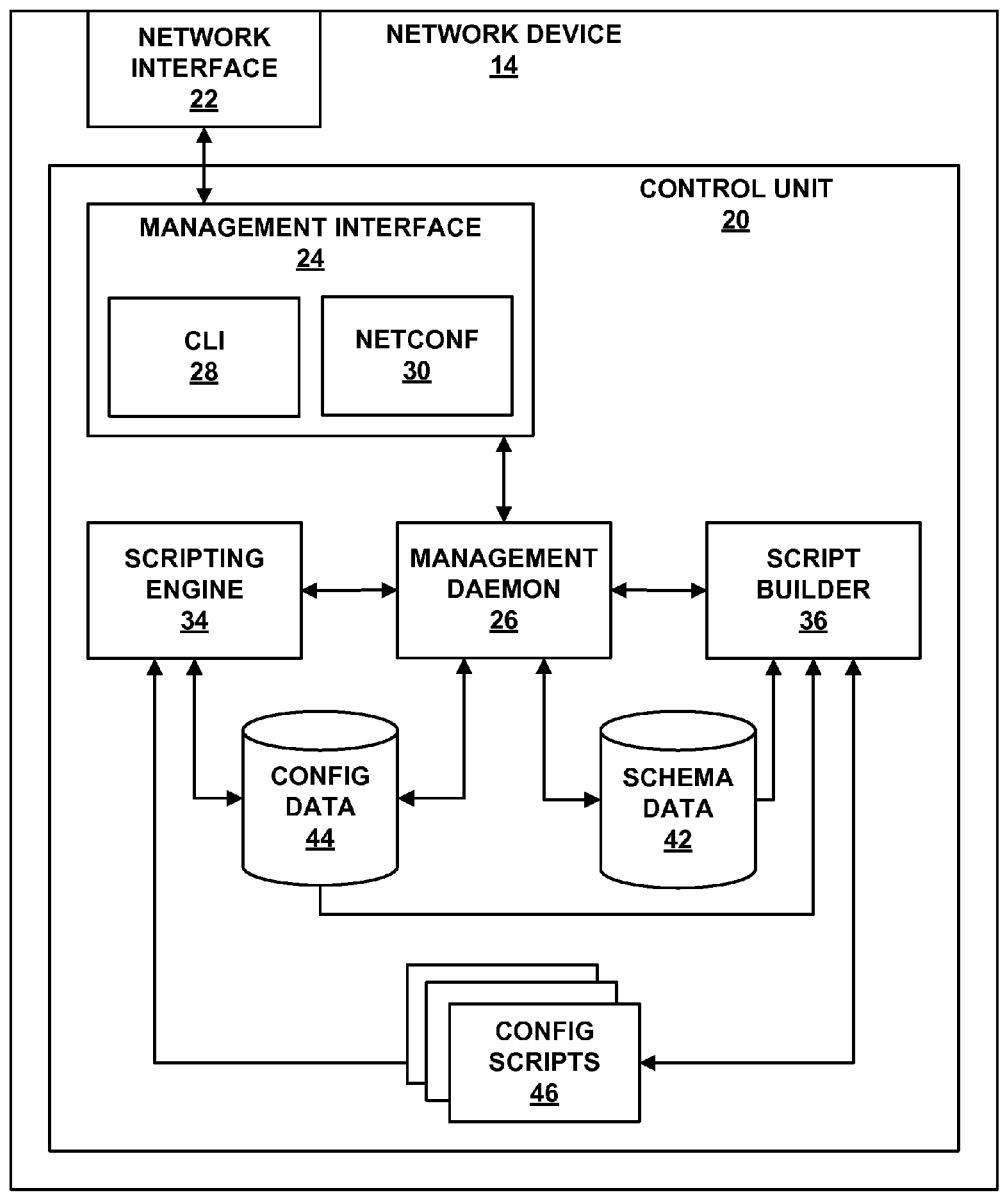
FIG. 2 is a block diagram illustrating components of an example network device that operates in accordance with aspects of this disclosure.

FIG. 2 is a block diagram illustrating components of an example network device 14 that operates in accordance with aspects of this disclosure. Network device 14 represents any one of elements 5 of FIG. 1 and is described below within the context of network 2 of FIG. 1 for purposes of example. FIG. 2 illustrates only one particular example of network device 14, and many other examples of network device 14 may be used in other instances and may include a subset of the components included in example network device 14 or may include additional components not shown in FIG. 2. In the example of FIG. 2, network device 14 includes control unit 20 and network interface 22.

Network interface 22 represents an example interface that can communicatively couple network device 14 to an external device, e.g., another element of an enterprise network (e.g., network 2), such as a router, switch, bridge, gateway, hub, or the like. Network interface 22 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Network device 14 may include multiple network interfaces in various examples (e.g., when network device 14 corresponds to a router or switch), although only one network interface is illustrated for purposes of example.

Control unit 20 represents any combination of hardware, software, and/or firmware for implementing the functionality attributed to control unit 20 and its constituent modules and elements. When control unit 20 includes software or firmware, control unit 20 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components.

Control unit 20 provides an operating environment for a number of different hardware or software modules that perform various processes and procedures of network device 14. In this example, control unit 20 includes management interface module 24, management daemon module 26, scripting engine module 34, and script builder module 36. Modules 24, 26, 34, and 36 may perform operations described herein using software, hardware, firmware, or a mixture of hardware, software, and firmware residing in and executing at network device 14. For example, control unit 20 of network device 14 may execute modules 24, 26, 34, and 36 as program code with one or more processors. In some examples, network device 14 may execute modules 24, 26, 34, and 36 as one or more virtual machines executing on underlying hardware. Modules 24, 26, 34, and 36 may operate independently or collectively to perform a process or service for network device 14. FIG. 2 illustrates various two-way communication paths for transmitting data and commands between modules 24, 26, 34, and 36 that facilitate collective operations performed on behalf of network device 14. For instance, management daemon module 26 shares a communication path between each of management interface module 24, scripting engine module 34, and script builder module 36.

Control unit 20 further includes schema data 42 and configuration data 44. Schema data 42 and configuration data 44 represent individual or a collective group of data stores, e.g., computer-readable storage medium capable of storing schema and configuration data for network device 14. These data stores may include, for example, random access memory (RAM), read only memory (ROM), flash memory, solid state drives, or the like. Control unit 20 and the underlying modules 24, 26, 34, and 36 may execute read and write instructions to access data stored at schema data 42 and configuration data 44. FIG. 2 illustrates communication paths between each of modules 26, 34, and 36, and one or more of schema data 42 and configuration data 44. For instance, management daemon module 26 shares a read-write communication path with both schema data 42 and configuration data 44. Scripting engine module 34 shares a read-write communication path with configuration data 44. Script builder module 36 shares a read-only communication path with schema data 42 and configuration data 44.

Control unit 20 further includes configuration scripts 46. Configuration scripts 46 represent instructions for reading and/or modifying configuration data 44 in accordance with one or more schemas of schema data 42. In one embodiment, configuration scripts 46 are written in a scripting language, such as Extensible Stylesheet Language Transformations (XSLT), which may be used when writing scripts that interact with XML-formatted documents. Configuration scripts 46 may also be written in another scripting language, such as PERL, Python, PHP, Ruby, JavaScript, TCL, shell scripting languages such as sh, bash, or dash, or other languages. Configuration scripts 46 may be interpreted upon execution, as opposed to compiled code that is linked and executed. In another embodiment, configuration scripts 46 may be written in a language that is compiled and executed, such as C++. FIG. 2 illustrate a one way communication path between scripting engine module 34 and configuration scripts 46 and a one way communication path between script builder module 36 and configuration scripts 46. Configuration scripts 46 are described in more detail below, however, these two communication paths illustrate that, in general, configuration scripts 46 are generated by script builder module 36 and executed by scripting engine module 34 to provide a common API for configuring network device 14 in accordance with a device-specific schema of network device 14.

Schema data 42 includes one or more manufacturer-supplied schemas (e.g., one or more XSD files) associated with network device 14. Schema data 42 includes data that specifies appropriate syntactical structure of configuration data 44 for network device 14. In some examples, schema data 42 is pre-loaded with one or more schemas by a manufacturer of network device 14. In other examples, schema data 42 is loaded, updated, or otherwise modified after installation of network device 14 in network 2. In any event, schema data 42 includes data representative of one or more schemas that describe the elements and attributes of a valid configuration file for network device 14 in view of the specifications of network device 14, the functions provided by network device 14, the network requirements for configuration of network device 14, and mechanisms for interacting with network device 14. As described in further detail below, a client, such as administrator 12, can interact with network device 14 and provide configuration data to network device 14, in the format specified by one or more of these schemas, to correctly configure network device 14 for a particular network service.

Configuration data 44 includes data (e.g., one or more text files, databases, tables, data structures, XML configuration files, combinations thereof, or the like) that specify, e.g., system parameters, routing policies, forwarding options, network flow statistics, error logs, user information, router chassis inventory, and performance metrics. This configuration hierarchy may be specified by one or more of the XSD files within schema data 42. For proper operation of network device 14, the data within configuration data 44 is organized according to one or more of the schemas of schema data 42. As described in further detail below, a client such as administrator 12, can interact with network device 14 to access configuration data 44 to manage a policy or relationship between network device 14 and other network devices of network 2, configure network interface 22, adjust parameters for network protocol supported by network device 14, specify physical components within network device 14, modify other information about network device 14, and the like. In one embodiment, as further illustrated by FIG. 4, configuration data 44 is arranged in the form of a multi-level configuration hierarchy, having a plurality of inter-related objects.

Control unit 20 includes management interface module 24 by which a client, for example administrator 12 of FIG. 1, directly or remotely, accesses and configures resources within network device 14 and obtains operational information for those resources. In this example, management interface module 24 includes CLI module 28 and NETCONF module 30 that handle requests for establishing, respectively, CLI and NETCONF communication sessions and interpret, respectively, CLI and NETCONF remote procedure calls (RPC), commands, and other instructions on behalf of management daemon module 26. In other words, management interface 24 can receive a network communication via network interface 22 and translate the communication, from a CLI or NETCONF message or command, into a message or command that management daemon module 26 can understand and interpret for performing a process on behalf of network device 14. The fact that FIG. 2 illustrates only CLI module 28 and NETCONF module 30 should be construed in no way as limiting. For instance, management interface module 24 may include other modules that handle requests for establishing communication sessions using other network protocols and interpreting commands and instructions defined by other protocols on behalf of management daemon module 26.

In general, management daemon module 26 executes commands to manage or manipulate configuration data 44, although management module 26 also manages other components of network device 14. Control unit 20 executes management daemon module 26 to manage the configuration of network device 14, e.g. by interacting with management information interface module 24, scripting engine module 34, script builder module 36, schema data 42, and configuration data 44. For example, after establishing a NETCONF session with device management system 10 of FIG. 1, management interface module 24 may receive a NETCONF command, such as a RPC, via network interface 22. Management daemon module 26 may receive the RPC from management interface module 24 along with any related data, parameter values, and the like communicated to network device 14 via the NETCONF session. Management daemon module 26 may execute the RPC, which in some examples, may result in management daemon module 26 configuring network device 14 according to the parameters of the RPC. For example, the RPC may cause management daemon module 26 to write to configuration data 44 at a location where data associated with the particular device setting is stored. Management daemon module 26 may send a confirmation message to management interface module 24 confirming execution of the RPC and a change of the particular setting. Management interface module 24 may process the confirmation message and outputs data confirming the change via network interface 22 in accordance with the NETCONF protocol.

In some examples, management daemon module 26 interprets a command from management interface module 24 and in response to the command, interacts with scripting engine module 34 or script builder module 36. For instance, management daemon module 26 may receive a RPC to invoke one of configuration scripts 46 to handle configuring network device 14. In response, management daemon module 26 may invoke scripting engine module 34 by sending a command to scripting engine module 34 for executing a particular one of configuration scripts 46 associated with the RPC. Scripting engine module 34 may interpret the command from management daemon module 26 and execute the particular one of configuration scripts 46 to change information stored in configuration data 44.

In other examples, management daemon module 26 may interpret a RPC as a command to invoke script builder 36 to generate, view, modify, and/or delete one of configuration scripts 46. Management daemon module 26 may invoke script builder module 36 by sending a run command to scripting builder module 36 or otherwise executing scripting builder module 36. In response, script builder module 36 may perform a series of operations related to outputting a user interface, parsing configuration data 44 for configurable attributes associated with network device 14, and generating, modifying, viewing, and/or deleting one of configuration scripts 46.

In the example of FIG. 2, device management system 10 of FIG. 1 may use NETCONF as one example of a mechanism for remotely configuring and provisioning network device 14. In some examples, as described herein, rather than individually formatting a set of NETCONF calls to conform to the device-specific schemas of network device 14, device management system 10 can use the same set of NETCONF calls to configure network device 14 that device management system 10 uses to configure other elements 5 of network 2 for a particular service. In other words, network device 14 can receive the same set of NETCONF calls for configuring network device 14 that other elements 5 of network 2 can receive, irrespective of differences in the individual schemas of network device 14 and the other elements 5. Network device 14 executes a custom, device-specific configuration script stored as a configuration script 46, which responds to the standard set of NETCONF calls, defined by a common API. This configuration script translates NETCONF calls that are formatted according to the common API into unique configuration commands that meet the criteria of one or more schemas within schema data 42. Moreover, script builder 36 can automatically generate this device-specific configuration script for network device 14, thereby alleviating any burden on administrator 12 in creating such a script.

For example, administrator 12 may wish to configure network device 14 to receive the standard set of NETCONF calls, formatted according to the common API for configuring network device 14 and each of elements 5 of network 2 for a particular service. Using network management system 10, administrator 12 may use device management system 10 to start the process of configuring network device 14 to handle the NETCONF API calls by establishing a CLI communication session with network device 14. Administrator 12 may use device management system 10 to send one or more commands via the CLI interface to write generic configuration data to network device 14 for the particular service. For example, administrator 12 may use device management system 10 to send one or more RPC to network device 14 for editing configuration data 44 of network device 14. The one or more RPC may include one or more parameter placeholder values, e.g., data that represents either actual or temporary configuration settings for provisioning network device 14 for the particular service.

Management interface module 24 of network device 14 may acknowledge the CLI session with device management system 10, receive the one or more RPC, and relay the RPC received during the CLI session to management daemon module 26. Management daemon module 26 may interpret the RPC and write the parameter place holder values to configuration data 44. Through management interface module 24, management daemon module 26 may send a confirmation message to device management system 10 acknowledging the successful write to configuration data 44.

Administrator 12 may use device management system 10 to send an additional RPC to invoke script builder 36 for generating a device-specific configuration script. Management daemon module 26 may interpret the RPC and determine the RPC represents a request to invoke script builder module 36.

Management daemon module 26 may invoke script builder module 36 that generates one or more configuration scripts 46 for modifying configuration information (e.g., configuration data 44) of the network device in accordance with a schema (e.g., schema data 42) of network device 14. Each of configuration scripts 46 include a common interface for invoking the configuration script and receiving one or more parameterized values associated with the modification of the configuration information.

Once invoked, script builder module 36 may output a user interface (such as a text-based user interface compatible with the CLI session at device management system 10) for receiving further instructions from a user (e.g., administrator 12) for building the device-specific configuration script. Management daemon module 26, operating with management interface module 24 transmits the user interface for inclusion in the CLI session of network management system 10. The user interface may at first include a series of prompts requesting initial information about the current script building session. For example, the user interface may include one or more prompts that request the user to specify a particular service associated with the current script building session, identify configuration data (e.g., template data) associated with the particular service, and the like. Once presented with the user interface at the CLI, administrator 12 can interact with the user interface and input responses at device management system 10 that address the series of prompts. Script builder module 36 may receive information from management daemon module 26 based on user responses sent from device management system 10 via the CLI session, such as, a service identifier and an identifier of the template configuration data related to the service. Based on the information, script builder module 36 may identify one or more schema stored at schema data 42 related to the script building session and in addition configuration data stored at configuration data 44 related to the script building session.

The user interface may further include options for interacting with script builder module 36, for example options may include an option to define configuration parameters for the service, an option to build a new configuration script for the service, enable a particular one of configuration scripts 46, and the like. Script builder module 36 may receive an indication from management daemon module 26 of a selection of the option to define configuration parameters associated with network device 14. For example, once presented with the options of the user interface at the CLI, administrator 12 can interact with the user interface and select one or more of the options outputted by script builder 36. In this example, administrator 12 selects the option to define configuration parameters. Management interface 24 receives the selection and relays the selection through management daemon module 26 which transmits the selection to script builder 36.

In response to the selection to define configuration parameters, script builder module 36 may parse the template configuration data specified during the user interface session located within configuration data 44 of network device 14 and automatically identify one or more candidate configuration parameters. In other words, script builder module 36 may perform a series of read operations on the information within configuration data 44 associated with the template configuration data to identify candidate, or possible, elements of the template configuration data that can be modified and as such, elements that a client may want to include as configuration parameters settable by the configuration script being generated. For example, script builder module 36 may use a XML pull parser to sequentially read each element, attribute, and data within an XML file—where the template configuration data is stored within configuration data 44. For each element, attribute, and data that the XML pull parser retrieves from the XML file, script builder module 36 may store the element, attribute, and data as a candidate configuration parameter.

Script builder module 36 may output one or more of the candidate configuration parameters to management interface module 24 for inclusion in the user interface currently embedded in the CLI session established with management system 10. From the CLI, administrator 12 may use device management system 10 to select one or more of the candidate configuration parameters included in the user interface. For instance, in response to outputting each candidate configuration parameter at the CLI, the user interface may require administrator 12 to type either "yes" or "no" at the CLI to indicate whether "yes" the candidate configuration parameter should be included as a configurable configuration parameter associated with the configuration script being generated, or "no" the candidate configuration parameter should not be included as a configurable configuration parameter. In cases when a "yes" response is received to identify the candidate configuration parameter as a configurable configuration parameter, script builder module 36 may include prompts requesting further information about the parameter (e.g., a parameter name, a description, and the like).

Script builder module 36 may receive a selection of the one or more candidate configuration parameters (and related information about the parameter). For example, management interface 24 may receive information associated with the selection of the one or more candidate configuration parameters from the CLI communication session and relay the information to management daemon module 26 which, in response, transmits the information to script builder 36. Script builder module 36 may receive the information and determine from the information, which of the one or more candidate configuration parameters administrator 12 selected from the user interface.

Once script builder module 36 receives the selection of the one or more candidate configuration parameters, script builder module 36 may generate, based on the selection and the schema, at least one configuration script within configuration scripts 46. Script builder module 36 may include logic to generate a file written in a scripting language, that script engine module 34 can execute. For example, according to at least one schema of schema data 42 related to the particular service identified above, script builder module 36 can generate script language that includes a series of NETCONF calls for configuring the selected configuration parameters in a way that conforms to the at least one schema based on values obtained when the configuration script is invoked. When executed by script engine module 34, the configuration script causes script engine module 34 to modify configuration data 44 for a particular service that conforms to at least one schema within schema data 42. The configuration script generated by script builder module 36 may include a common API, from which, script engine module 34 can receive parameterized values associated with the candidate configuration parameters selected from the user interface.

The configuration script may be invoked through a RPC from the CLI or NETCONF interface of network management system 10. The RPC may include a configuration script identifier as well as values associated with the selected candidate configuration parameters that the configuration script is configured to receive. The format of the RPC is defined by the common API associated with a particular service, for configuring each of elements 5 and network device 14 of network 2. For example, network management system 10 may establish a NETCONF session with network device 14 and during that session, transmit the RPC to invoke the configuration script. Management interface 24 receives the RPC and associated configuration parameter values via network interface 22 and relays the RPC and configuration parameter values to management daemon module 26. Management daemon module 26 invokes scripting engine module 34 to execute the one of configuration scripts 46 associated with the identifier in the RPC.

In response, scripting engine module 34 executes the one of configuration scripts 46, thereby configuring network device 14 according to the parameterized values received in the RPC. For each selected configuration parameter, the configuration script may include one or more instructions, that when executed by scripting engine module 34, write data (e.g., characters, numerical values, and the like) associated with the selected configuration parameter to configuration data 44, to configure network device 14 in accordance with the schema of network device 14.

Figure 3:
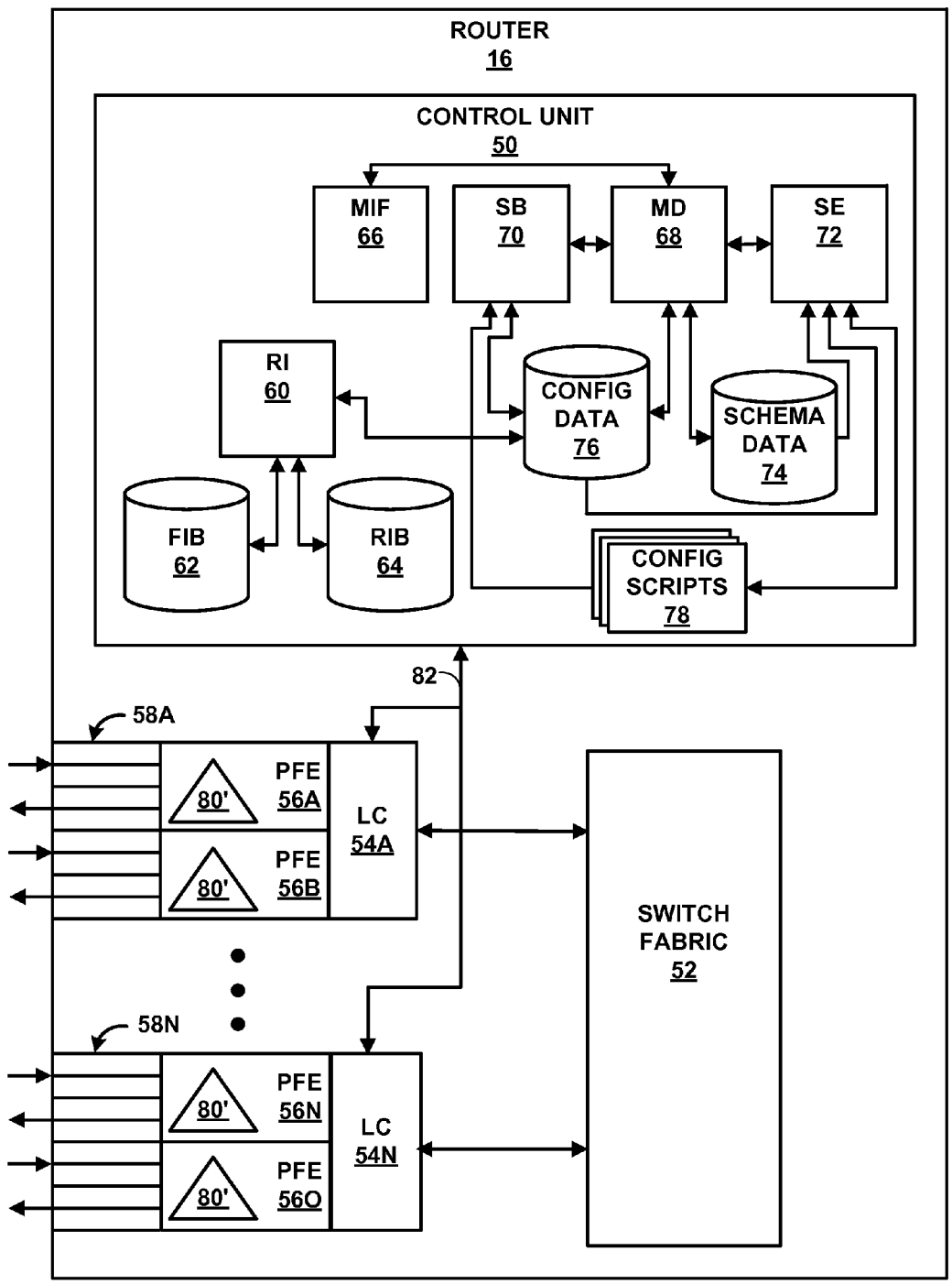
FIG. 3 is a block diagram illustrating components of an example router that operates in accordance with aspects of this disclosure.

FIG. 3 is a block diagram illustrating components of example router 16 that operates in accordance with aspects of this disclosure. Router 16 forwards data packets within or between networks, such as network 2 of FIG. 1. For example, router 16 may be located at a gateway between network 2 of FIG. 1 and a public network, such as the Internet. In general, router 16 represents a detailed example of network device 14 of FIG. 2 and one of elements 5 of FIG. 1, and is described below within the context of network 2 of FIG. 1 and network device 14 of FIG. 2. FIG. 3 illustrates only one particular example of router 16. Many other examples of router 16 may be used in other instances and may include a subset of the components included in example router 16 or may include additional components not shown in FIG. 3.

In the example of FIG. 3, router 16 includes control unit 20 that provides control plane functionality for router 16. Router 16 also includes switch fabric 52 interconnecting a set of line cards 54A-54N (collectively "LC 54"), each of which includes one or more packet-forwarding engines 56A-56O (collectively "PFE 56") that send and receive traffic by a set of interface cards 58A-58N (collectively "IFC 58") that typically have one or more physical network interfaces (ports). LC 54, components thereof, and switch fabric 52 collectively provide a data plane (also referred to as a forwarding plane) for forwarding network traffic. Although not shown in FIG. 3, PFE 56 may each include a central processing unit (CPU), memory and one or more programmable packet-forwarding application-specific integrated circuits (ASICs). Switch fabric 52 provides a high-speed interconnect for forwarding incoming data packets between PFE 56 for transmission over a network.

Control unit 50 provides control plane functions for router 16. For example, control unit 50 provides an environment for storing network topology information and providing a management interface to allow user access and configuration of router 16. The operating environment of control unit 50 may be implemented solely in software, or hardware, or may be implemented as a combination of software, hardware or firmware. For example, control unit 50 may include one or more processors which execute software instructions. In that case, control unit 50 may include various software modules or daemons executing on an operating system and various data stores that maintain information associated with these modules or daemons. Control unit 50 may include one or more non-transitory computer-readable storage mediums, such as computer memory or hard disk, for storing executable instructions and data.

Control unit 50 includes routing instance module 60 (RI 60) that controls instances of network traffic routing (e.g., L3 routing) and network traffic forwarding (e.g., L2 forwarding) functions. In general, RI 60 maintains a routing information base data 64 (RIB 64) that stores network routing information and network topology data representing a logical topology of a network, e.g., a spanning tree, from the perspective of the interfaces. RI 60 may also store updated MAC tables, MPLS label allocations, pseudowire information or other information related to the routing function. Based on RIB 64, RI 60 generates forwarding information base data 62 (FIB 62) to contain forwarding data structures for programming each of PFEs 56.

In this example, control unit 50 is connected to each of LC 54 by a dedicated internal communication link 82. For example, dedicated link 82 may comprise a Gigabit Ethernet connection. In one embodiment, control unit 50 communicates data representative of a software copy 80' of FIB 62 into each of PFE 56 to program each of PFE 56 and thereby control forwarding of traffic by the corresponding components within the data plane that are associated with each routing instance controlled by RI 60. This allows FIB related data, stored in memory (e.g., on-chip RAM) of in each of PFE 56, to be updated without degrading packet-forwarding performance of router 16. In some instances, control unit 50 may derive separate and different software-copies of FIB related data for each respective PFE 56. In addition, one or more of PFE 56 may include packet-forwarding ASICs (not shown) that each one of PFE 56 programs with a hardware-copy of FIB related data based on the software-copies of FIB related data (i.e., hardware versions of the software FIB) copied to each respective PFE 56. In other, more complex embodiment, router 16 may have many (e.g., forty-eight, or sixty-four) individual LC 54, each of which may have four PFE 56 that each couple to up to multiple (e.g., sixteen) IFC 58.

In the example of FIG. 3, control unit 50 includes management interface module 66 (MIF 66) and management daemon module 68 (MD) for managing the configuration of router 16, e.g., to configure router 16 to communicate on network, by manipulating configuration data 76 according to one or more schema 74. For example, device management system 10 may establish a NETCONF session with router 16 to configure router 16. Device management system 10 may send configuration data and a RPC that management daemon module 68 interprets as a request to change information within configuration data 76. Control unit 50 also includes script builder module 70 and scripting engine module 72 that are respectively configured to generate configuration scripts 78 and executed configuration scripts 78 according to the techniques described herein.

For example, administrator 12 may wish to generate a device-specific configuration script 76 that includes a common interface (e.g., API) for configuring router 16 in accordance with one or more schema data 74. During a CLI session established between device management system 10 and router 16 by administrator 12, management interface module 66 and management daemon module 68 may receive a RPC to invoke script builder module 70. In response, management daemon module 68 may invoke script builder module 70. Script builder module 70 may cause management interface module 66 to output a user interface within the CLI session that administrator 12 may interact with during the build of the configuration script. From the user interface within the CLI session, administrator 12 may use device management system 10 to select an option for building a new script and cause script builder module 70 to begin the configuration script build process.

To generate the configuration script, script builder module 70 may parse template configuration data stored at configuration data 76 of router 16 for one or more candidate configuration parameters. In other words, an XML pull parser of script builder module 70 may parse one or more XML files that include the template configuration data within configuration data 76 to identify potential (i.e., candidate) configurable attributes of router 16. Either sequentially or after identifying multiple configurable attributes, script builder module 70 may output the one or more candidate configuration parameters to the user interface of the CLI session with device management system 10.

From the user interface, administrator 12 may use device management system 10 to select one or more of the candidate configuration parameters to include as configurable attributes in the configuration script. In addition, from the user interface, administrator 12 may use device management system 10 to provide other information that further describes the selected configuration parameters (e.g., parameter name, a label, and the like). Script builder module 70 may receive a selection of the one or more candidate configuration parameters from management interface module 66 and management daemon module 68. Based on the selection received via the CLI session with administrator 12, and further based on schema data 74, script builder module 70 may generate at least one of configuration scripts 76.

The configuration script generated by script builder module 70 is generated to conform to a scripting language that scripting engine module 72 can execute. After generating the configuration script, administrator 12 may use device management system 10 to send a RPC to router 16 to invoke the generated configuration script. The RPC command complies with the common API and includes values to configure each of the candidate configuration parameters identified during the build process. Management daemon module 68 may receive the RPC and invoke the configuration script using scripting engine module 72. Once executed by scripting engine module 72, the configuration script correctly configures router 16 according to the information within schema data 74.

A detailed example of FIG. 3 for configuring router 16 according to the techniques described herein is described below including example NETCONF commands and CLI commands to generate a configuration script and to invoke and interact with the configurations script. As described above, administrator 12 may wish to generate a device-specific configuration script 76 for configuring router 16 for a particular service. The device-specific configuration script 76 includes a common interface for configuring router 16 in accordance with one or more schema data 74. In this example, the particular service is identified as a "vpn-service".

In this example, administrator 12 causes device management system 10 to establish a CLI session between device management system 10 and router 16. During the CLI session, management interface module 66 and management daemon module 68 may receive one or more RPC to specify generic (e.g., template) configuration data 76 for the vpn-service. An example CLI session between device management system 10 and router 16 is shown below and illustrates an example for specifying template configuration data stored within configuration data 76 for the vpn-service.

cli> configure
    [edit]
    cli# edit groups vpn-service-template-group
    [edit groups vpn-service-template-group]
    cli# edit interfaces
    [edit groups vpn-service-template-group interfaces]
    cli# set ge-0/0/0 unit 101 encapsulation vlan-bridge
    cli# set ge-0/0/0 unit 101 vlan-tags outer 0

The above series of CLI commands causes management daemon module 68 to perform a series of write operations at configuration data 76. The series of write operations results in data being generated and stored at configuration data 76. The data includes the following structure and an associated identifier "vpn-service-template-group":

```
interfaces {
    ge-0/0/0 {
        description "Connected to customer- site-0";
        unit 0 {
            family bridge {
                interface-mode access;
                vlan-id 300;
            }
        }
    }
}
poe {
    interface all;
}
```

Management interface module 66 and management daemon module 68 may next receive a RPC to invoke script builder module 70. For example, administrator 12 may type the following command at the CLI of network management system 10:

$> op service-builder

In response to the above command received over the CLI of router 16, management daemon module 68 may invoke script builder module 70. Invoking script builder module 70 causes management interface module 66 to output a user interface at the CLI that administrator 12 may interact with to customize the build of the configuration script. The user interface may begin with the following prompt, requesting administrator 12 to identify the service related with the script building session and an identifier associated with template configuration data of the service, as shown, administrator 12 enters the service identifier and the identifier of the template configuration data stored at configuration data 76:

Welcome to Service Builder Script: (v1.0)
    Enter the service name: vpn-service
    Enter the group name: vpn-service-template-group Next, script builder module 70 may cause the user interface to include a series of options related with the script building session. Administrator 12 may select one option within the user interface for (shown below as option 1, "Build Service API") for defining the interface associated with the configuration script being generated from this session.

[Op Script Builder—Main Menu]
    ------------------------------------
    1. Show Variables
    2. Build Service API
    3. Enable Service API
    Q. Quit
    ------------------------------------
    Enter Selection:> 1

Based on the selection received by script builder module 70 to define the interface associated with the configuration script being generated, script builder module 70 may parse configuration data 76 of router 16 for one or more candidate parameters. For example, an XML pull parser of script builder module 70 may parse data (e.g., an XML file) associated with the template configuration data identifier "vpn-service-template-group" stored at configuration data 76 to identify potential (i.e., candidate) configurable attributes of router 16, i.e., candidate configuration parameters. In one example, the XML pull parser may associate each "leaf node" of the template configuration data with a candidate configuration parameter. For example, the XML file may store the configuration data according to a multi-level configuration hierarchy, having a plurality of inter-related objects or nodes. The highest level node is referred to as a root node. The inter-related objects share connections, i.e., branches, with other objects or nodes in adjacent levels. The objects that do not share a branch with a lower level object are known as leaf nodes. The XML pull parser may traverse the XML file that stores the configuration data and identify each of these leaf nodes as candidate configuration parameters.

Either sequentially or after identifying multiple candidate configuration parameters, script builder module 70 may output the one or more candidate parameters to the user interface of the CLI session with device management system 10. The following text shows and example output of script builder module 70 within the user interface of the CLI session:

List of variables under each hierarchy to parameterize:
1. [edit groups vpn-service-template-group interfaces]
1.1. interface/name
1.2. interface/description
1.3. interface/unit/name
1.4. interface/unit/family/bridge/interface-mode
1.5. interface/unit/family/bridge/vlan-id
2. [edit groups vpn-service-template-group poe]
2.1.                                                                     interface/name
--------------------------------------------------------------------
Enter Selection:> [default:all]

From the user interface, administrator 12 may use device management system 10 to select one or more of the candidate configuration parameters to include as configurable attributes in the configuration script. Script builder module 70 may receive a selection of the one or more candidate configuration parameters from management interface module 66 and management daemon module 68. In this example, administrator 12 selects "all". In other words, administrator 12 selects and option to generate a configuration script that uses all of the leaf nodes of the template configuration data as configurable parameters. In one example, the selected candidate configuration parameters satisfy the common API of a particular service, e.g. the vpn-service.

Following the selection of candidate configuration parameters script builder module 70 may prompt the user for information about each of the selected parameters. Script builder module 70 may prompt the user for information such as, an name for each parameter and a description about the candidate configuration parameter to include in a help menu. Administrator 12 may use device management system 10 to respond to each prompt for information about the configuration parameters. Administrator 12 may enter parameter names that satisfy the common API of the vpn-service. In other words, administrator 12 may use device management system 10 to enter parameter names that are similar to the parameter names entered in generating a configuration script for the vpn-service for a different network device. Bellow shows administrator 12 naming and describing each of the selected configuration parameters:

Enter parameter name for: 1.interfaces/interface/name
*************************
[edit groups vpn-service-template-group interfaces]
Name for this parameter? InterfaceName
Do you want to revise 'InterfaceName'? (yes/no) [no]:
Enter parameter name for: 2.interfaces/interface/description
*************************
[edit groups vpn-service-template-group interfaces]
Name for this parameter? InterfaceDesc
Do you want to revise 'InterfaceDesc'? (yes/no) [no]:
Enter parameter name for: 3.interfaces/interface/unit/name
*************************
[edit groups vpn-service-template-group interfaces]
Name for this parameter? UnitName Do you want to revise 'UnitName'? (yes/no) [no]:
Enter parameter name for: 4.interfaces/interface/unit/family/bridge/interface-mode
*************************
[edit groups vpn-service-template-group interfaces]
Name for this parameter? Mode
Do you want to revise 'Mode'? (yes/no) [no]:
Enter parameter name for: 5.interfaces/interface/unit/family/bridge/vlan-id
*************************
[edit groups vpn-service-template-group interfaces]
Name for this parameter? Vlanid
Do you want to revise 'Vlanid'? (yes/no) [no]:
Do you want to commit the previously selected options to create vpn-servicescript? (yes/no) [yes]:
Enter parameter name for:
2.poe/interface/name
*************************
[edit groups vpn-service-template-group poe]
Name for this parameter? PoeInterfaceName
Do you want to revise 'PoeInterfaceName'? (yes/no) [no]:

Based on the selection of the candidate configuration parameters and the associated parameter information received via the CLI session with administrator 12, and further based on schema data 74 of router 16, script builder module 70 may generate a configuration script 76. For example, the configuration script generated by script builder module 70 is generated to conform to a scripting language that scripting engine module 72 can execute. Scripting builder module 70 may output a confirmation message to the user interface that the configuration script was successfully generated and allow the user to enable the configuration script. For example, below is an example user interface that shows the configuration script "vpn-service" was generated and a menu for receiving an option to enable the configuration script.

. . . Created service script: /var/db/scripts/op/vpn-service.slax
[Op Script Builder—Main Menu]
------------------------------------
1. Show Variables
2. Build Service API
3. Enable Service API
Q. Quit
------------------------------------
Enter Selection:>3

After generating the configuration script, and once enabled, administrator 12 may use device management system 10 to send a RPC to router 16 to invoke the generated configuration script. The RPC command complies with the common API and includes values to configure each of the candidate parameters identified during the build process. Management daemon module 68 may receive the RPC and invoke the configuration script using scripting engine module 72. Once executed by scripting engine module 72, the configuration script correctly configures router 16 according to the information within schema data 74. Below is a CLI command that causes management daemon module 68 to output the names and descriptions of the arguments, i.e., the configuration parameters, of the configuration script vpn-service specified during the build process described above:

$> op vpn-service ?
Possible completions:
<[Enter]> Execute this command
<name> Argument name
InterfaceDesc Text description of interface
InterfaceName Name of interface Mode Interface mode (access or trunk)
PoeInterfaceName Name of interface
UnitName Name of unit
Vlanid Access mode VLAN membership
Action Please enter either create/delete/update
Detail Display detailed output
service-id Service Name
| Pipe through a command After enabling the configuration script, device management system 10 may establish a NETCONF session with router 16, and configure router 16 according to the common API for vpn-service recognized by the vpn-service configuration script described above. Below are example NETCONF commands that cause management daemon module 68 to invoke the vpn-service configuration script described above and configure router 16 using the common API for the vpn-service:

<rpc>
    <op-script>
        <script>vpn-service</script>
        <action>create</action>
        <service-id>vpn-service</service-id>
        <InterfaceName>ge-0/0/1</InterfaceName>
        <InterfaceDesc>Connected to customer site-1</InterfaceDesc>
        <Mode>access</Mode>
        <PoeInterfaceName>all</PoeInterfaceName>
        <UnitName>0</UnitName>
        <Vlanid>300</Vlanid>
    </op-script>
    </rpc>

Figure 4:
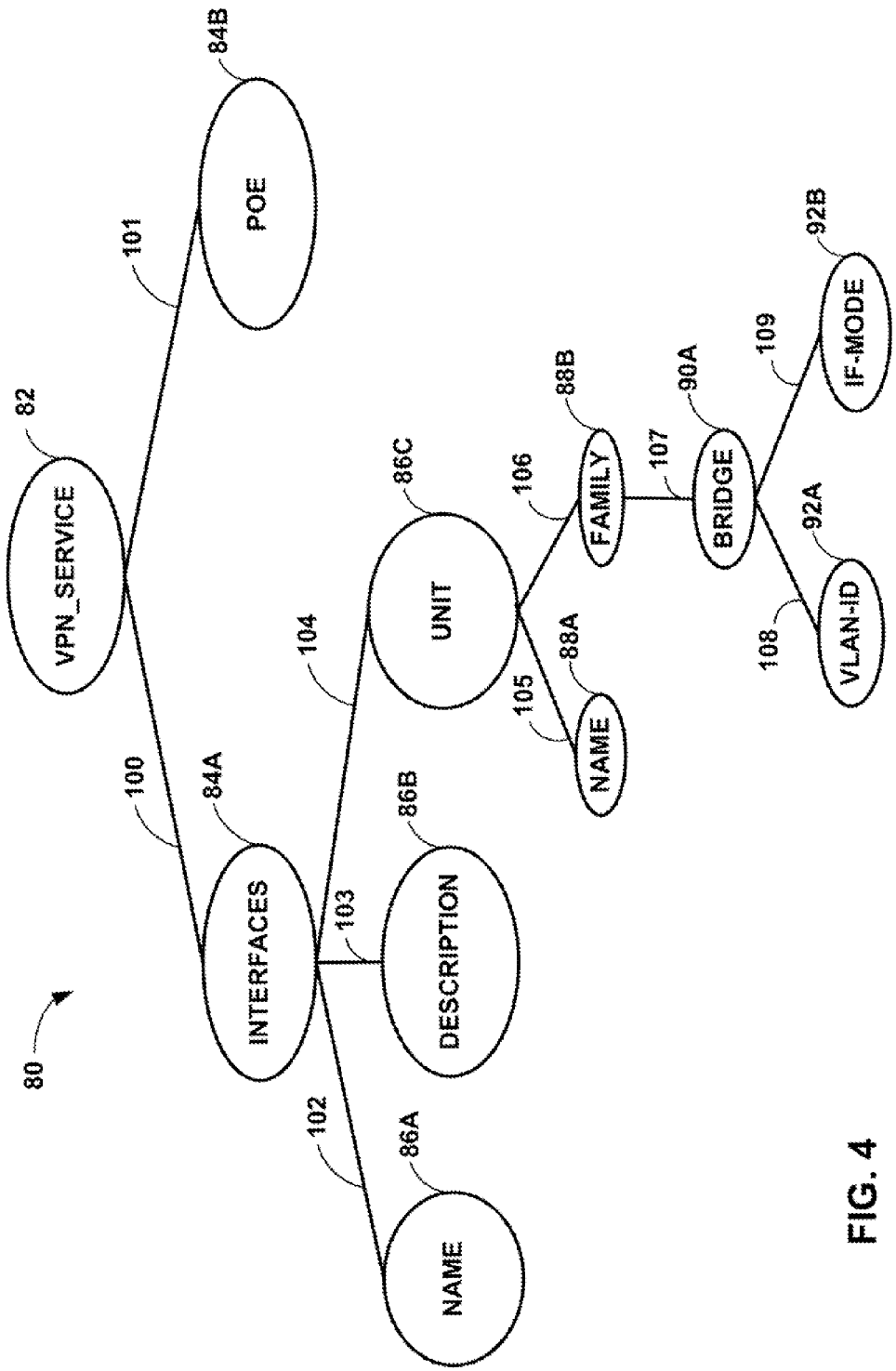
FIG. 4 illustrates an example of configuration data arranged in the form of a multi-level configuration hierarchy having a plurality of inter-related objects.

FIG. 4 illustrates an example of configuration data 80 arranged in the form of a multi-level configuration hierarchy having a plurality of inter-related objects. FIG. 4 is described below within the context of FIG. 3. For example, the series of CLI commands described above that cause management daemon module 68 to perform a series of write operations at configuration data 76 prior to invoking script builder module 70 may generate configuration data 80 (e.g., as an XML file) that includes an organizational hierarchy as illustrated in FIG. 4. In one example, the organizational hierarchy illustrated in FIG. 4 is defined by one or more schema(s) 74.

In this example, configuration data 80 includes inter-related objects ("objects") 82, 84A, 84B, 86A, 86B, 86C, 88A, 88B, 90A, 92A, and 92B interconnected by branches 100-109. Object 82 is a root object, and objects 84A, 84B, 86A, 86B, 86C, 88A, 88B, 90A, 92A, and 92B are child objects. For exemplary purposes only two child objects, object 84A and 84B of root object 82 are illustrated: INTERFACES object 84A and POE object 84B. As illustrated, each of the child objects 84A and 84B have associated textual labels, e.g., "INTERFACES," and "POE." Child object 84A has child objects 86A-86C with textual labels, respectively, "NAME", "DESCRIPTION", and "UNIT". Child object 86C has child objects 88A and 88B with textual labels, respectively, "NAME" and "FAMILY". Child object 88B has child object 90A and child object 90A with textual label "BRIDGE." Child objects 92A and 92B have textual labels, respectively, "VLAN-ID" and "IF-MODE" and no child objects dependent therefrom. Depending upon the complexity of network 12 and network device 14, configuration data 80 may be arranged as a hierarchy having numerous levels inter-relating thousands of objects or more.

In this example, objects 84B, 86A, 86B, 88A, 92A, and 92B are leaf nodes. In other words, these objects do not have child objects dependent therefrom. In one example, the XML pull parser of script builder module 70 of router 16 can traverse this hierarchy of configuration data 80 and determine these leaf nodes do not have dependent child object and determine the leaf nodes are candidate configuration parameters. Each leaf node in configuration data 80 includes a data element that represents a configurable attribute of router 16. For each selected configuration parameter, script builder module 70 generates scripting language, that when executed by scripting engine module 72, receives a parameterized value associated with the data element at the respective leaf node.

Figure 5:
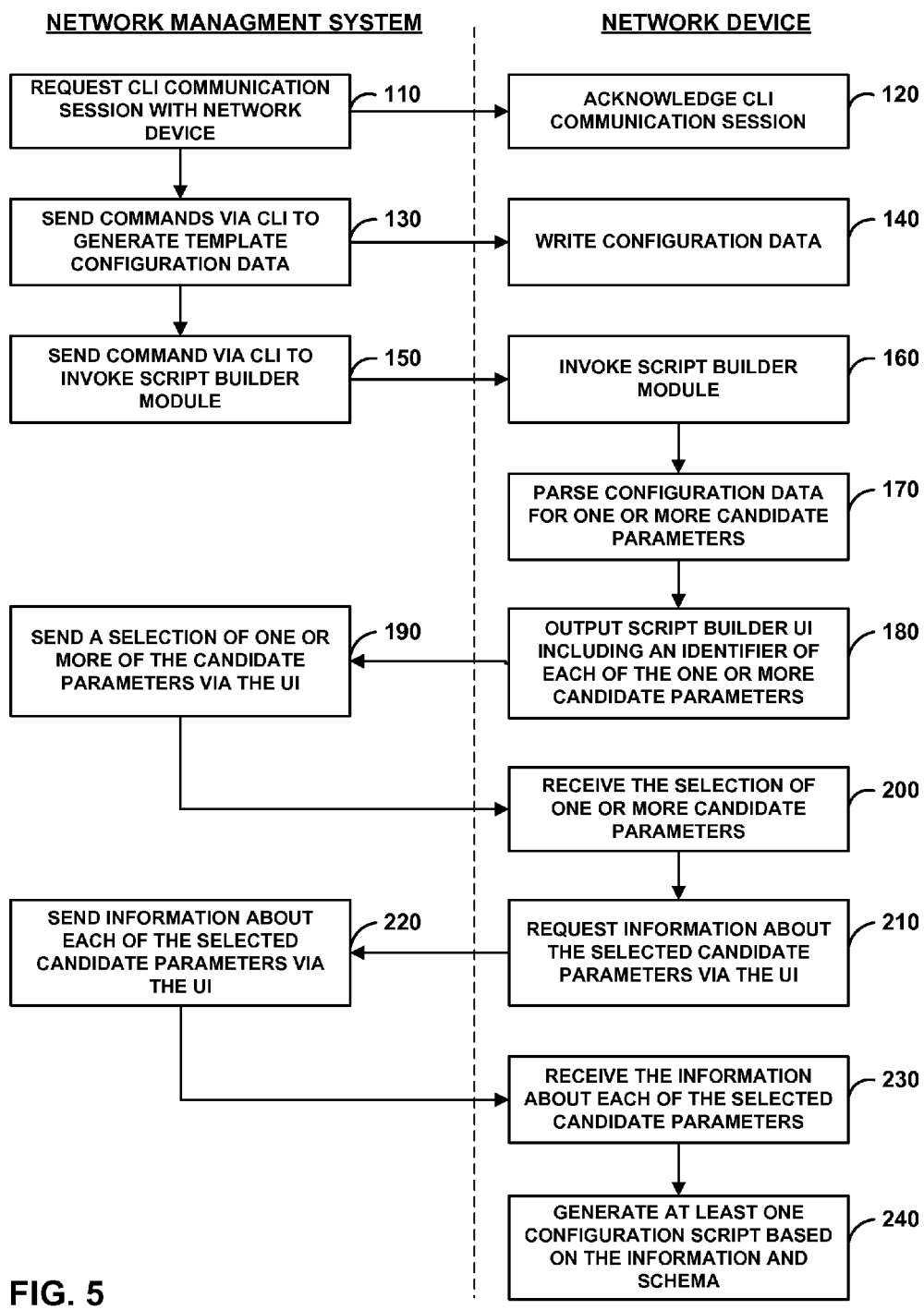
FIG. 5 is a flowchart illustrating example operations of an example network management system and example network device, using the techniques of this disclosure.

FIG. 5 is a flowchart illustrating example operations of an example network management system and example network device, using the techniques of this disclosure. The process of FIG. 5 may be performed by network management system 10 and network device 14 illustrated in FIG. 1 and FIG. 2. For purposes of illustration only, FIG. 5 is described below within the context of network management system 10 and network device 14 of FIG. 1 and FIG. 2.

In the example of FIG. 5, network management system 10 may request a CLI communication session with network device 14 (110). For example, administrator 12 may wish to configure network device 14 to receive a standard set of NETCONF calls, formatted according to a common API for configuring network device 14 and each of elements 5 of network 2 for a particular service. Administrator 12 may enter one or more commands at the CLI of network management system 10 that cause network management system 10 to send a request to network device 14 to establish a CLI communication session with network device 14. Network device 14 may receive the request from network management system 10 and in response, acknowledge the CLI communication session (120). For example, network device 14 may send an acknowledgement message to network management system 10, at which point, administrator 12 may receive an indication at network management system 10 that the CLI communication session has been established.

FIG. 5 further illustrates that network management system 10 may send commands via the CLI to generate template configuration data (130). For example, administrator 12 may enter one or more commands at the CLI interface of network management system 10 to write generic configuration data at network device 14 for a particular service. In one example, administrator 12 may enter one or more RPC at the CLI for editing configuration data 44 of network device 14. The one or more RPC may include one or more parameter placeholder values, e.g., data that represents either actual or temporary configuration settings for provisioning network device 14 for the particular service. Network management system 10 may send and network device 14 may receive the one or more commands via the CLI interface. Network device 14 may write configuration data (140). For example, management interface module 24 of network device 14 may relay the one or more RPC for writing configuration data to management daemon module 26 which may interpret the RPC and write the parameter place holder values to configuration data 44. Through management interface module 24, management daemon module 26 may send a confirmation message to device management system 10 acknowledging the successful write to configuration data 44.

FIG. 5 further illustrates network management system 10 may send a command via the CLI to invoke a script builder module (150). For example, administrator 12 may enter a RPC at the CLI of network management system 10 to invoke script builder module 36 for generating a device-specific configuration script. Network management system 10 may send and management interface module 24 of network device 14 may receive the RPC. Management daemon module 26 of network device 14 may receive the RPC from management interface module 24 and determine the RPC represents a request to invoke script builder module 36. Management daemon module 26 of network device 14 may invoke script builder module 36 (160). For example, management daemon module 26 may command script builder module 36 to begin executing at network device 14.

Once invoked, script builder module 36 may output a user interface (such as a text-based user interface compatible with the CLI session at device management system 10) for receiving further instructions from administrator 12 for building the device-specific configuration script. The user interface may at first include a series of prompts requesting initial information about the current script building session. Script builder module 36 may receive an indication from management daemon module 26 of a selection of the option to define configuration parameters associated with network device 14. For example, once presented with the options of the user interface at the CLI, administrator 12 can interact with the user interface and select one or more of the options outputted by script builder 36. In this example, administrator 12 selects the option to define configuration parameters. script builder 36 receives the selection from management daemon module 26.

In response to the selection to define configuration parameters, script builder module 36 may parse configuration data 44 for one or more candidate configuration parameters (170). Script builder module 36 may parse configuration data 44 of network device 14 in accordance with schema data 42 of network device 14 for one or more candidate parameters for configuration. Each of the one or more candidate parameters comprises a configurable attribute of network device 14 in configuration data 44. Script builder module 36 may traverse configuration data 44 based at least in part on a multi-level hierarchy of configuration elements defined by schema 42 to identify a plurality of leaf nodes of configuration data 44 (e.g., schema 42 of network device 14 may conform to a schema for an extensible markup language and configuration data 44 may conform to the extensible markup language). Each leaf node of the plurality of leaf nodes comprises a configurable attribute of network device 14. Script builder module 36 may determining the one or more candidate parameters correspond to each of the plurality of leaf nodes.

Script builder module 36 may output an identifier of each of the one or more candidate configuration parameters for inclusion in the user interface currently embedded in the CLI session established with management system 10 (180). From the CLI, administrator 12 may use device management system 10 to select one or more of the candidate configuration parameters included in the user interface.

Administrator 12 may select from the user interface one or more of the candidate parameters. Device management system 10 may send the selected candidate parameters via the UI (190). Script builder module 36 may receive a selection of the one or more candidate configuration parameters (200). For example, management interface 24 may receive information associated with the selection of the one or more candidate configuration parameters from the CLI communication session and relay the information to management daemon module 26 which, in response, transmits the information to script builder 36.

In response to the selection, script builder module 36 may request additional information about the selected candidate parameters via the user interface (210). For example, script builder module 36 may request a plurality of label identifiers. Each label in the plurality of labels corresponds to a different one of the selected candidate parameters. Both the selected candidate parameters and the plurality of labels conform to a platform-independent interface for a remote procedure call for provisioning a service on any one of a plurality of different devices within a network. For example, administrator 12 may have designed a common API that administrator 12 would like to use to configure multiple different network devices for a service (e.g., a LAN, a vpn service, etc.) on network 2. The common API includes a RPC call that can receive parameterized values associated with configurable attributes (e.g., an IP address, a connection speed, a protocol specifier, and the like) of each of these different devices. Administrator 12 may have labels for each of these parameters for common use across the different devices. Use of common labels may eliviate the need for administrator 12 to keep track of different terminology used in defininig similar attributes between services. Within the user interface, script builder module 36 may request information, such as labels, about the selected parameters.

Script builder module 36 may receive the information about each of the selected candidate parameters (230). For example, administrator 12 may enter a label for each of the selected parameters and script builder module 36 may receive, in addition to an indication of a selection of the one or more candidate parameters, a plurality of labels.

Based on the selected candidate parameters, the plurality of labels, and schema data 42, script builder module 36 may generate at least one device-specific configuration script within configuration scripts 46(240). For example, script builder module 36 may include logic to generate a file written in a scripting language, that script engine module 34 can execute for modifying configuration data 44 of network device 14 in accordance with schema 42. Script builder module 36 may configure the device-specific configuration script to receive, via the platform-independent interface for the remote procedure call, parameterized information associated with at least one of the selected candidate parameters and update, based on the parameterized information, the configurable attribute in the configuration data that corresponds to the at least one of the selected candidate parameters.

For example, according to at least one schema of schema data 42 script builder module 36 can generate script language that includes a series of automatic NETCONF calls for configuring the selected configuration parameters in a way that conforms to schema 42. Script builder module 36 may map, based on the schema, each label of the plurality of labels to a portion of configuration data 44 that corresponds to the corresponding different one of the selected candidate parameters. In other words, script builder module 36 may associate each label with a portion of configuration data 44. Rather than associating each portion of the configuration data 44 with a label defined by schema 42, the device-specific configuration script can use the mapping to associate the common API syntax with a portion of configuration data 44. Script builder module 36 may generate, based on the mapped plurality of labels, a series of commands in a script language to update the portion of configuration data 44 that corresponds to the configurable attribute.

Figure 6:
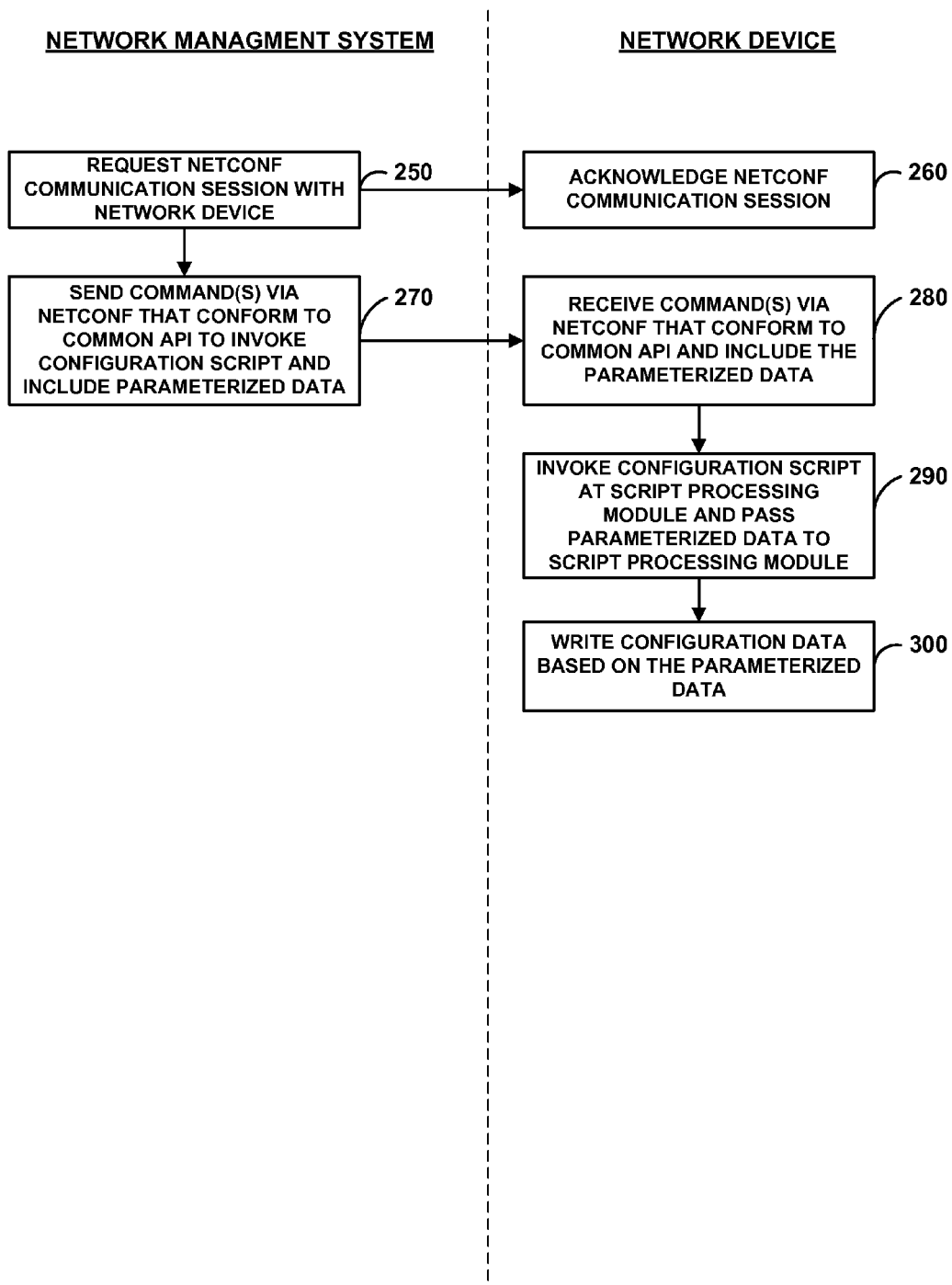
FIG. 6 is a flowchart illustrating further example operations performed of an example network management system and an example network device, using the techniques of this disclosure.

FIG. 6 is a flowchart illustrating further example operations performed of an example network management system and an example network device, using the techniques of this disclosure. The process of FIG. 6 may be performed by network management system 10 and network device 14 illustrated in FIG. 1 and FIG. 2. For purposes of illustration only, FIG. 6 is described below within the context of network management system 10 and network device 14 of FIG. 1 and FIG. 2.

When executed by script engine module 34, a device-specific configuration script 46 may cause script engine module 34 to modify configuration data 44 for executing a particular service. The configuration script 46 may include a common API (e.g., a platform-independent interface for a remote procedure call for provisioning a service on any one of a plurality of different devices within a network), from which, script engine module 34 can receive parameterized values associated with selected candidate configuration parameters. The configuration script may be invoked through a RPC from the CLI or NETCONF interface of network management system 10. The RPC may include a configuration script identifier as well as values associated with the selected candidate configuration parameters that the configuration script is configured to receive. The format of the RPC is defined by the common API associated with a particular service, for configuring each of elements 5 and network device 14 of network 2. For example, network management system 10 may request that a NETCONF session be established with network device 14 (250). Network device 14 may acknowledge the NETCONF communication session request (260). During the NETCONF session, network management system 10 may send one or more commands via conform to the common API to invoke configuration script, including parameterized data (270). For example, these NETCONF commands may include a RPC with one or more values associated with the selected candidate parameters. The RPC may be used by network management system 10 to configure multiple different network devices of network 2 for a particular service.

FIG. 6 further illustrates that management interface 24 of network device 14 may receive the one or more commands (e.g., a remote procedure call) via the NETCONF session that conforms to this common API and include the parameterized data or information (280). In response management daemon module 26 may invoke scripting engine module 34 to execute the one of configuration scripts 46 associated with the RPC and pass the parameterized data to scripting engine module 34 (290). In other words, the configuration script may be executed by a scripting engine module 34 (e.g., a script processing module). Scripting engine module 34 may perform a series of operations associated with the configuration script. For example, scripting engine module 34 may write new configuration data to configuration data 44 based on the parameterized information received via the RPC. The script processing module may otherwise update the configurable attribute in configuration data 44 that corresponds to the selected candidate parameters based on the parameterized information and in accordance with schema 42 of the network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:

parsing, by script builder software of a network device, configuration data of the network device in accordance with a schema of the network device for one or more candidate parameters for configuration, wherein each of the one or more candidate parameters comprises a configurable attribute of the network device in the configuration data;

outputting, at an interface of the network device, a parameter identifier of each of the one or more candidate parameters;

receiving, at the interface of the network device, an indication of a selection of the one or more candidate parameters and a plurality of labels, wherein each label in the plurality of labels corresponds to a different one of the selected candidate parameters, and wherein both the selected candidate parameters and the plurality of labels conform to a platform-independent interface for a remote procedure call for provisioning a service on any one of a plurality of different devices within a network;

generating, by the script builder software of the network device, based at least in part on the selected candidate parameters and the schema, at least one configuration script for modifying the configuration data of the network device in accordance with the schema, wherein generating the at least one configuration script comprises configuring the at least one configuration script to:

receive, via the platform-independent interface for the remote procedure call, parameterized information associated with at least one of the selected candidate parameters; and update, based on the parameterized information, the configurable attribute in the configuration data that corresponds to the at least one of the selected candidate parameters.

2. The method of claim 1, wherein generating the at least one configuration script for modifying the configuration data of the network device in accordance with the schema further comprises:
  mapping, by the script builder software of the network device and based on the schema, each label of the plurality of labels to a portion of the configuration data that corresponds to the corresponding different one of the selected candidate parameters; and
  generating, by the script builder software of the network device and based on the mapped plurality of labels, a series of commands in a script language to update the portion of the configuration data that corresponds to the configurable attribute.

3. The method of claim 1, wherein generating the at least one configuration script for modifying the configuration data of the network device in accordance with the schema further comprises:
  generating, by the script builder software of the network device, the at least one configuration script to include an interface adapted to receive the parameterized information in accordance with at least one of a network management protocol and a command line interface protocol.

4. The method of claim 1 further comprising: receiving, at the interface of the network device, the remote procedure call and the parameterized information;
  executing, by script processing software of the network device and based on the remote procedure call, the at least one configuration script; and
  updating, by the script processing software of the network device, based on the parameterized information and in accordance with the schema of the network device, the configurable attribute in the configuration data that corresponds to the at least one of the selected candidate parameters.

5. The method of claim 4, wherein receiving the remote procedure and the parameterized information comprises receiving the remote procedure and the parameterized information via at least one of a command line interface of the network device and a network management interface of the network device, wherein the network management interface comprises a NETCONF interface.

6. The method of claim 1, wherein parsing configuration data of the network device for one or more candidate parameters further comprises:
  traversing, by the script builder software of the network device and based at least in part on a multi-level hierarchy of configuration elements defined by the schema, the configuration data to identify a plurality of leaf nodes of the configuration data, wherein each leaf node of the plurality of leaf nodes comprises a configurable attribute of the network device; and
  determining, by the script builder software of the network device, based at least in part on the plurality of leaf nodes, the one or more candidate parameters.

7. The method of claim 6, wherein the multi-level hierarchy of configuration elements defined by the schema of the network device conforms to a schema for an extensible markup language and the configuration data conforms to the extensible markup language.

8. The method of claim 1, further comprising: enabling, by the script builder software of the network device, the at least one configuration script for execution by script processing software of the network device, wherein enabling the configuration script comprises configuring the network device to receive the remote procedure call and the parameterized information via at least one of a network management interface of the network device and a command line interface of the network device.

9. The method of claim 1, wherein the script builder software executes at the network device.

10. The method of claim 1, wherein the script builder software executes at a remote network management system.

11. A device comprising:
  a memory comprising:
  one or more schema,
  configuration data corresponding to one or more configurable attributes of the device and stored within the memory in accordance with the one or more schema, and one or more configuration scripts that receive parameterized information at a platform-independent interface for a remote procedure call for provisioning a service on any one of a plurality of different devices within a network, and that update the configuration data based on the parameterized information in accordance with the schema;
  an interface configured to:
  output a parameter identifier of one or more candidate parameters for configuration, wherein each of the one or more candidate parameters corresponds to one of the one or more configurable attributes in the configuration data, and receive an indication of a selection of the one or more candidate parameters and a plurality of labels, wherein each label in the plurality of labels corresponds to a different one of the selected candidate parameters;
  a control unit comprising:
  script builder software configured to:
  parse the configuration data in accordance with the schema for the one or more candidate parameters, and
  generate the one or more configuration scripts based at least in part on the selected candidate parameters and the schema.

12. The device of claim 11, wherein the script builder software of the control unit is further configured to:
  map, based on the schema, each label of the plurality of labels to a portion of the configuration data that corresponds to the corresponding different one of the selected candidate parameters; and
  generate, based on the mapped plurality of labels, a series of commands in a script language to update the portion of the configuration data that corresponds to the configurable attribute.

13. The device of claim 11, wherein the interface is further configured to receive the remote procedure call and the parameterized information, and
  wherein the control unit is further configured to execute script builder software configured to:
  execute the one or more configuration scripts; and
  update, in accordance with the schema of the device, the configurable attribute in the configuration data that corresponds to at least one of the selected candidate parameters.

14. The device of claim 11, wherein the schema defines a multi-level hierarchy of configuration elements, wherein the configuration data is stored in accordance with the multi-level hierarchy of configuration elements and comprises a plurality of leaf nodes that each comprise one of the more configurable attributes of the device;

wherein the script builder software of the control unit is further configured to:
traverse the multi-level hierarchy of configuration elements in the configuration data to determine the one or more candidate parameters from the plurality of leaf nodes.

15. The device of claim 11, wherein the interface is further configured to receive the remote procedure call and the parameterized information via at least one of a network management interface of the device and a command line interface of the network device; and
wherein the control unit further comprises:
script processing software configured to execute at least one of the one or more configuration scripts, and
wherein the script builder software is further configured to enable the at least one of the one or more configuration scripts for execution by the script processing software.

16. A non-transitory computer-readable storage medium comprising instructions that, when executed, cause a processor to:
parse, by script builder software executed by the processor, configuration data of a network device in accordance with a schema of the network device for one or more candidate parameters for configuration, wherein each of the one or more candidate parameters comprises a configurable attribute of the network device in the configuration data;
output, at an interface executed by the processor, a parameter identifier of each of the one or more candidate parameters;
receive, at the interface executed by the processor, an indication of a selection of the one or more candidate parameters and a plurality of labels, wherein each label in the plurality of labels corresponds to a different one of the selected candidate parameters, and wherein both the selected candidate parameters and the plurality of labels conform to a platform-independent interface for a remote procedure call for provisioning a service on any one of a plurality of different devices within a network;
generate, by the script builder software executed by the processor, based at least in part on the selected candidate parameters and the schema, at least one configuration script for modifying the configuration data of the network device in accordance with the schema, wherein generating the at least one configuration script comprises configuring the at least one configuration script to:
receive, via the platform-independent interface for the remote procedure call, parameterized information associated with at least one of the selected candidate parameters; and
update, based on the parameterized information, the configurable attribute in the configuration data that corresponds to the at least one of the selected candidate parameters.

17. The non-transitory computer-readable storage medium of claim 16, further comprising instructions that, when executed, cause the processor to:
map, by the script builder software executed by the processor and based on the schema, each label of the plurality of labels to a portion of the configuration data that corresponds to the corresponding different one of the selected candidate parameters; and
generate, by the script builder software executed by the processor and based on the mapped plurality of labels, a series of commands in a script language to update the portion of the configuration data that corresponds to the configurable attribute.

18. The non-transitory computer-readable storage medium of claim 16, further comprising instructions that, when executed, cause the processor to:
receive, at the interface executed by the processor, the remote procedure call and the parameterized information;
execute, by script processing software executed by the processor and based on the remote procedure call, the at least one configuration script; and
update, by the script processing software executed by the processor, based on the parameterized information and in accordance with the schema of the network device, the configurable attribute in the configuration data that corresponds to the at least one of the selected candidate parameters.

19. The non-transitory computer-readable storage medium of claim 16, further comprising instructions that, when executed, cause the processor to:
traverse, by the script builder software executed by the processor and based at least in part on a multi-level hierarchy of configuration elements defined by the schema, the configuration data to identify a plurality of leaf nodes of the configuration data, wherein each leaf node of the plurality of leaf nodes comprises a configurable attribute of the network device; and
determine, by the script builder software executed by the processor, based at least in part on the plurality of leaf nodes, the one or more candidate parameters.

20. The non-transitory computer-readable storage medium of claim 16, further comprising instructions that, when executed, cause the processor to:
enable, by the script builder software executed by the processor, the at least one configuration script for execution by script processing software executed by the processor, wherein enabling the configuration script comprises configuring the network device to receive the remote procedure call and the parameterized information via at least one of a network management interface executed by the processor and a command line interface executed by the processor.

* * * * *